United States Patent Office
3,403,186
Patented Sept. 24, 1968

3,403,186
STABILIZATION OF PHENOLS
Hans L. Schlichting, Grand Island, and Ellis I. Lichtblau, Kenmore, N.Y., assignors to Hooker Chemical Corporation, Niagara Falls, N.Y., a corporation of New York
No Drawing. Filed Nov. 30, 1965, Ser. No. 510,683
14 Claims. (Cl. 260—621)

ABSTRACT OF THE DISCLOSURE

A mixture of a trivalent phosphorus-containing organic compound of the formula

where Z can be hydroxyl, Z and Z' can be hydrogen and Z, Z' and Z" are selected from the group consisting of alkyl of one to twelve carbon atoms, phenyl, phenoxy, substituted phenyl, substituted phenoxy, where the substituents are selected from alkyl of one to eight carbon atoms, chloro and bromo groups, and substituted phenoxy where the substituents are selected from alkyl of one to eight carbon atoms, chloro and bromo groups, and an organic acid selected from an aromatic ortho-hydroxycarboxylic acid of the formula

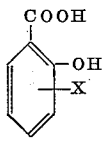

where X is selected from the group consisting of hydrogen, alkyl of one to five carbon atoms, and carboxyl groups, and a saturated polycarboxylic acid containing from two to ten carbon atoms and from two to three carboxyl groups, each agent present being in a stabilizing proportion, can be used to stabilize phenol, halophenols, alkylphenols, and related products against deterioration in color and odor with age. A synergistic effect is suggested.

This invention relates to the stabilization of phenol ($C_6H_5OH$), halophenols, alkylphenols, and related products. More particularly, this invention relates to a method for improving the resistance of said compounds against deterioration in color and odor with age and to compounds effective as stabilizers for them.

It is well known that phenols, including halo- and alkylphenols, though carefully purified, tend to discolor on exposure to light and air. If trace impurities are present, which are often unavoidable in a commercial scale operation, the formation of colored material is even more accelerated. This discoloration appears to stem from the formation of oxidation products of the phenol. The reaction mechanism of this oxidation reaction is complicated, involving radicals, ions, and ionic radicals as well.

Numerous compounds have been claimed as effective inhibitors of deterioration of color and odor. The compounds hitherto known as stabilizers for phenol may effectively inhibit one (or maybe more) reaction path(s) in the complex oxidation reaction, but not all of the possible paths. For instance, phosphoric acid (U.S. 2,752,398) inhibits a discoloration of a phenol which is accelerated by contact with metal (steel containers, ducts, valves, and so forth). But as known and illustrated later, the stabilization is less effective if the phenol is also exposed to air and/or sunlight and/or additional trace amounts of caustic or acids, such as hydrochloric acid, sulfuric acid, and so forth. Other stabilizers, for instance organic polybasic carboxylic acids (U.S. 2,672,485), or Schiff's bases (British 787,859) or amino acids (British 807,736) may inhibit more or less effectively a discoloration of a phenol which is promoted and accelerated by exposure to air and/or sunlight and/or additional trace amounts of acids or alkalies. But the stabilization is less effective (almost nil) if the phenol is also exposed to metal and/or metal oxides, as for instance steel, iron, rust, and so forth.

It has now been found that a mixture of an aromatic o-hydroxycarboxylic acid, such as salicylic acid or hydroxyisophthalic acid, with a polycarboxylic acid, such as citric acid or oxalic acid, and with an ester of a phosphorus acid, such as alkyl or aryl phosphites, preferably, however, where practical, a triphenyl phosphite, wherein the phenyl group corresponds with the phenol to be protected, represents an effective stabilizer-mix preventing a discoloration of a phenol under substantially all conditions that occur in commercial practice. The trivalent phosphorus-containing organic compounds to be used as stabilizers in this invention are selected from phosphites, phosphonites, phosphinites and phosphines whose general formulae are:

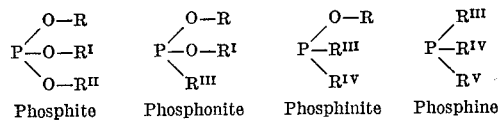

Not included within the scope of this invention are pentavalent phosphorus-containing compounds, such as compounds containing a (P=O) group.

For purposes of this invention these four formulae can be regrouped and defined by one formula

where Z can be hydroxyl, Z and Z' can be hydrogen and Z, Z' and Z" can be the same or different, alkyl of one to twelve carbon atoms, alkoxy of one to twelve carbon atoms, phenyl, phenoxy, substituted phenyl where the substituents are selected from alkyl of one to eight carbon atoms, chloro and bromo groups, and substituted phenoxy where the substituents are selected from alkyl of one to eight carbon atoms, chloro and bromo groups. More than one such trivalent phosphorus-containing compound may be used.

Examples of phosphite esters to be used in this invention are: trimethyl phosphite, triethyl phosphite, tri(2-ethylhexyl)phosphite, tridecyl phosphite, trilauryl phosphite, triphenyl phosphite, tri(o-cresyl)phosphite, tri(o-chlorophenyl)phosphite, tri(bromophenyl)phosphite, diphenyl-decyl phosphite, phenyldidecyl phosphite, dimethyl phosphite ((CH₃O)₂PHO), diethyl phosphite

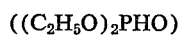

dibutyl phosphite ((C₄H₉O)₂PHO), di(2-ethylhexyl)-phosphite ((C₈H₁₇O)₂PHO), dilauryl phosphite

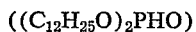

phenyl neopentyl phosphite, nonylphenyl neopentyl phosphite, diphenyl phosphite ((C₆H₅O)₂PHO), di(o-cresyl)-phosphite, di(chlorophenyl)phosphite, di(bromophenyl)-phosphite, diphenyl decyl phosphite, and the like.

Examples of phosphonites to be used in this invention are: dimethyl methylphosphonite, diethyl methylphosphonite, di(n-butyl)-hydrogen phosphonite, diphenyl phenylphosphonite, di(o-cresyl)-o-cresylphosphonite, di(o-chlorophenyl)o-chlorophenylphosphonite, diamyl amylphosphonite, dibenzyl methylphosphonite, and the like.

Examples of phosphinites to be used in this invention are: methyl dimethylphosphinite, ethyl diethylphosphinite, methyl di(n-butyl)phosphinite, phenyl diphenylphosphinite, o-cresyl di(o-cresyl)phosphinite, o-chlorophenyl di(o-chlorophenyl)phosphinite, benzyl dimethylphosphinite, and the like.

Examples of phosphines to be used in this invention are: tri(n-butyl)phosphine, diphenyl phosphine, triphenyl phosphine, di(o-cresyl)phosphine, tri(o-cresyl)phosphine, di(o-chlorophenyl)-phosphine, tri(o-chlorophenyl)phosphine, dicyclohexyl phosphine, and the like.

The trivalent phosphorus-containing organic compound can be used in admixture with other agents to stabilize the phenol. Especially preferred among these is an organic acid component to be used in the stabilizer-mix, selected from aromatic ortho-hydroxy-carboxylic acids and saturated aliphatic polycarboxylic acids. The aromatic ortho-hydroxycarboxylic acids to be used as stabilizers are of the formula:

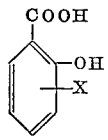

where X is selected from hydrogen, alkyl of one to five carbon atoms, and carboxyl groups. Illustrative of these compounds are salicylic acid, 4-methylsalicylic acid, 4-tertiary butylsalicylic acid, hydroxyterephthalic acid, and 4-hydroxyisophthalic acid; however, other acids within the defined formula may also be used. More than one such acid may be used.

The saturated aliphatic polycarboxylic acids to be used as stabilizers contain from two to ten carbon atoms and are unsubstituted except in that they have from two to three carboxyl groups, and may also contain one or more hydroxyl substituents. Illustrative of these compounds are tartaric acid, citric acid, malic acid, malonic acid, succinic acid, suberic acid, azelaic acid, glutaric acid, adipic acid, pimelic acid, sebacic acid, oxalic acid, glyceric acid, tartronic acid, and the like acids. More than one such acid may be used. We prefer to use a mixture of citric acid and oxalic acid.

Triphenyl phosphite is the preferred phosphite component for stabilizing phenol, tri-o-cresyl phosphite for stabilizing o-cresol, and so forth. However, according to the present invention, any available triphenyl phosphite may be used as the phosphite component to inhibit discoloration of a phenol, including mixed aryl phosphites (for instance, cresyldiphenyl phosphite) or acidic phosphites (for instance, diphenyl phosphite). Surprisingly, in comparative tests, although the stabilizer-mix is applied in the same concentrations as either one of the components, the effectiveness appears to be clearly improved, suggesting a synergistic effect.

According to this invention, adding a stabilizing amount of the stabilizer-mix comprising an o-hydroxycarboxylic acid, an aliphatic polycarboxylic acid and an ester of a phosphorus-containing acid to a phenol, preferably immediately after the phenol has been distilled, is highly effective in inhibiting a change in color of the phenol, even under extreme storage conditions, such as being held in a molten state and in steel containers contaminated with caustic, scale and rust; or being held in a molten state exposed to the daily sunlight in glass containers contaminated with caustic, scale and rust.

Each agent is present in a stabilizing amount. The amount of the stabilizer-mix employed corresponds to between about 0.001 percent and about 0.5 percent, preferably between about 0.002 percent and about 0.02 percent by weight of the phenol. In any event, the total stabilizer-mix is present in a stabilizing proportion.

It has surprisingly been found that the incorporation with a phenol of a stabilizing amount of (a) triphenyl phosphite, (b) salicylic or hydroxyisophthalic acid, and (c) citric or oxalic acid, inhibits most effectively color development than the incorporation of any one of the components alone. The components may normally be mixed in equal amounts by weight. However, different ratios may also be used for economical reasons or because a certain ratio of trace impurities or other promoters of color are expected in the phenol. For instance, the ratio of component (a) (triphenyl phosphite) may be increased in case of extended exposure to iron surfaces. If these iron surfaces are heavily corroded with rust, scale and various metal oxides thus likely to be present, the ratio of component (c) (citric or oxalic acid) may be advantageously increased. If extended exposure to sunlight is expected, component (b) (salicylic or hydroxyisophthalic acid) may be mixed in a higher ratio.

Chelating agents not effective in preventing a discoloration as such, may effectively supplement the claimed stabilizer-mix as defined in this invention in case of extreme corrosion. These commonly known effects of chelating agents to dissolve and/or to inactivate harmful suspension of metals and metal oxides may be additionally supplied to supplement the effectiveness of the claimed stabilizer-mix. A chelating agent, however, cannot replace either one of the component agents without a drastic reduction of the color inhibitor effects. Suitable chelating agents are, for instance, ethylenediamine-N,N,N',N'-tetraacetic acid, or preferably because of a more favorable solubility 1,2-diaminocyclohexane-N,N,N',N'-tetraacetic acid.

Phenols to be stabilized by the method of this invention include, for example, phenol ($C_6H_5OH$), its lower alkyl homologues, such as the isomeric cresols and xylenols, mono- and dibutylphenols, the isomeric amylphenols, and the isomeric octylphenols, nonyl phenols, and so forth, halophenols containing one to five halogen atoms, such as chlorophenol, bromophenol, dichlorophenols and dibromophenols, fused ring phenols, such as the naphthols, methylene and alkylidene linked bisphenols as represented by 2,2'-, 2,4'- and 4,4'-dihydroxydiphenylmethane, 2,2-(4,4'-dihydroxydiphenyl)propane, and 1,2-(4,4'-dihydroxydiphenyl)ethylene, and polyhydric phenols as typified by resorcinol, pyrogallol, and hydroquinone. In other words, the phenols to be stabilized by this invention are selected from the group consisting of phenol, unsubstituted polyhydric monocyclic phenols, unsubstituted fused ring phenols, unsubstituted alkylidene linked bisphenols, their lower alkyl derivatives and their halogenated derivatives.

Color measurement of commercial phenol is generally given by reference to the American Public Health Association (APHA) color scale, ranging for instance from zero to 70. However, this scale is not sensitive enough to be used to measure the initial development of colored materials in phenol stored under various conditions. In our studies, as illustrated in the examples below, a conventional photometric technique, described for instance by W. West in Weissberger, "Technique of Organic Chemistry," vol. 1, part 2, p. 1399, Interscience Publisher Inc., New York, N.Y., 1949, was used because the first slightly colored compounds formed in phenol obey Beer's law. That is, for phenol, the light absorption at the wavelength of 425 m$\mu$ is a function of the concentration of these compounds and the length of the sample cell. A light filter for this wavelength is standard equipment for most commercially available Electrophotometers. For other phenols the most suitable wavelengths are somewhat different; however, at 425 m$\mu$ there is sufficient sensitivity for comparison purposes and since a color filter in this range was available, it was used in the Electrophotometric measurements for those phenols as well.

Typical color stabilization effects obtained by incorporating the described mixture in a phenol are illustrated in the following examples, which are not to be construed as limiting except as defined in the appended claims.

Example 1

In a comparative series of tests, the compositions shown in Table I were added to 940 grams (10 moles) of freshly distilled USP-grade phenol ($C_6H_5OH$), in the amounts indicated.

Each one of the phenol mixtures was divided into four different portions of about 200 grams to which were added (1) Nothing (2) 4 milligrams NaOH (=20 parts per million)
(3) 4 milligrams HCl (=20 parts per million)
(4) 20 grams iron nails and 4 milligrams NaOH Then the samples were heated to about 100 degrees centigrade and exposed to ultraviolet light (sun lamp), while a slow stream of air was bubbled through the phenol. The formation of color was measured every hour by reading the percentage of light transmission at 425 m$\mu$ (Electrophotometer) versus freshly distilled colorless phenol. The results for a reading after six hours compared with unstabilized phenol as control are summarized in Table I.

The outstanding color stabilizing effects of the stablized mixtures according to the present invention are readily apparent by the figures in the last column of Table I. Mixtures (a)–(h) are in accordance with this invention, while stabilizers (i)–(u) are for comparative purposes.

TABLE I.—PHENOL STABILIZATION

| Stabilizers (0.01 percent by weight) | Percent light transmission at 425 m$\mu$ (6 hours) | | | | |
|---|---|---|---|---|---|
| | 1 | 2 | 3 | 4 | Total 1-4 |
| | $O_2$/UV | $O_2$/UV/ NaOH | $O_2$/UV/ HCl | Fe/NaOH/ $O_2$/UV | |
| None (control) | 30 | 0 | 20 | 10 | 80 |
| (a) 31 milligrams salicylic acid, 31 milligrams citric acid, 32 milligrams triphenyl phosphite (total 0.01 percent by weight) | 85 | 75 | 80 | 80 | 320 |
| (b) 31 milligrams salicylic acid, 31 milligrams oxalic acid, 32 milligrams triphenyl phosphite | 83 | 78 | 78 | 80 | 321 |
| (c) 31 milligrams hydroxyisophthalic acid, 31 milligrams citric acid, 32 milligrams triphenyl phosphite | 88 | 80 | 82 | 78 | 328 |
| (d) 31 milligrams hydroxyisophthalic acid, 31 milligrams oxalic acid, 32 milligrams triphenyl phosphite | 88 | 80 | 80 | 78 | 326 |
| (e) 47 milligrams oxalic acid, 47 milligrams triphenyl phosphite | 80 | 80 | 80 | 75 | 315 |
| (f) 94 milligrams diphenyl phosphine | 78 | 60 | 70 | 15 | 223 |
| (g) 94 milligrams tri(n-butyl)phosphine | 80 | 70 | 70 | 10 | 230 |
| (h) 31 milligrams diphenyl phosphine, 31 milligrams oxalic acid, 31 milligrams salicylic acid | 96 | 90 | 80 | 54 | 320 |
| (i) 31 milligrams tri(n-butyl)phosphine, 31 milligrams oxalic acid, 31 milligrams salicylic acid | 99 | 95 | 80 | 20 | 294 |
| (j) 31 milligrams malic acid, 31 milligrams salicylic acid, 31 milligrams dimethyl methyl phosphonite | 85 | 70 | 70 | 40 | 265 |
| (k) 94 milligrams dimethyl methyl phosphonite | 80 | 65 | 70 | 20 | 235 |
| (l) 94 milligrams salicylic acid | 80 | 40 | 40 | 10 | 170 |
| (m) 94 milligrams oxalic acid | 80 | 50 | 50 | 60 | 240 |
| (n) 94 milligrams citric acid | 78 | 50 | 50 | 50 | 228 |
| (o) 94 milligrams triphenyl phosphite | 78 | 60 | 60 | 55 | 253 |
| (p) 94 milligrams phosphoric acid | 83 | 60 | 65 | 65 | 273 |
| (q) 47 milligrams salicylic acid, 47 milligrams citric acid | 85 | 60 | 60 | 40 | 245 |
| (r) 47 milligrams hydroxyisophthalic acid, 47 milligrams oxalic acid | 92 | 70 | 70 | 60 | 292 |
| (s) 47 milligrams hydroxyisophthalic acid, 47 milligrams citric acid | 88 | 70 | 70 | 50 | 278 |
| (t) 94 milligrams DL-alanine | 50 | 50 | 50 | 10 | 160 |
| (u) 94 milligrams disalicylidene ethylenediamine | 50 | 40 | 40 | 10 | 140 |

Example 2

In a manner similar to that described in Example 1, portions of freshly distilled o-cresol were mixed 0.01 percent by weight of stabilizer mixture. The color stability expressed as percent light transmission as found after two hours, is summarized in Table II. Mixtures (a)–(d) are in accordance with this invention, while stabilizers (e)–(i) are for comparative purposes.

TABLE II.—o-CRESOL STABILIZATION

| Stabilizers (0.01 percent by weight) | Percent light transmission at 425 m$\mu$ (2 hours) | | | | |
|---|---|---|---|---|---|
| | 1 | 2 | 3 | 4 | Total 1-4 |
| | $O_2$/UV | $O_2$/UV/ NaOH | $O_2$/UV/ HCl | Fe/NaOH/ $O_2$/UV | |
| None (control) | 30 | 10 | 10 | <10 | 60 |
| (a) Salicylic acid+oxalic acid +tri-o-cresyl phosphite | 50 | 45 | 50 | 50 | 195 |
| (b) Salicylic acid+citric acid +triphenyl phosphite | 40 | 40 | 45 | 45 | 170 |
| (c) HIP[1]+oxalic acid +tri-o-cresyl phosphite | 55 | 50 | 55 | 55 | 215 |
| (d) HIP[1]+citric acid +triphenyl phosphite | 50 | 50 | 55 | 50 | 205 |
| (e) Salicylic acid | 35 | 20 | 20 | 10 | 85 |
| (f) Oxalic acid | 40 | 35 | 30 | 20 | 125 |
| (g) Citric acid | 40 | 30 | 30 | 20 | 120 |
| (h) Triphenyl phosphite | 40 | 30 | 30 | 30 | 130 |
| (i) Phosphoric acid | 42 | 35 | 35 | 30 | 142 |

[1] Hydroxyisophthalic acid.

Example 3

In a manner similar to that described in Example 1, portions of freshly distilled chlorophenol were mixed with stabilizer mixtures (0.01 percent by weight) shown in Table II. The color stability expressed as percent light transmission after six hours is shown in Table III. Mixtures (a)–(d) are in accordance with this invention, while stabilizers (e)–(i) are for comparative purposes.

TABLE III.—o-CHLOROPHENOL STABILIZATION

| Stabilizers (0.01 percent by weight) | Percent light transmission at 425 mμ (6 hours) | | | | Total 1–4 |
|---|---|---|---|---|---|
| | 1 O₂/UV | 2 O₂/UV/ NaOH | 3 O₂/UV/ HCl | 4 Fe/NaOH/ O₂/UV | |
| None (control) | 35 | 30 | 30 | 20 | 115 |
| (a) Salicylic acid +oxalic acid +P(OPh)₃ | 70 | 60 | 65 | 50 | 245 |
| (b) Salicylic acid +citric acid +P(OPh)₃ | 60 | 50 | 60 | 50 | 220 |
| (c) Hydroxyisophthalic acid +oxalic acid+P(OPh)₃ | 65 | 60 | 62 | 60 | 247 |
| (d) Hydroxyisophthalic acid +citric acid+P(OPh)₃ | 65 | 60 | 65 | 55 | 245 |
| (e) Salicylic acid | 40 | 40 | 42 | 20 | 142 |
| (f) Oxalic acid | 45 | 40 | 42 | 35 | 162 |
| (g) Citric acid | 40 | 35 | 40 | 40 | 155 |
| (h) Triphenyl phosphite | 50 | 35 | 40 | 40 | 165 |
| (i) H₃PO₄ | 50 | 40 | 45 | 45 | 180 |

Those skilled in the art will see modifications which can be made without departing from the scope of this invention. The invention described herein is not to be limited except as defined in the appended claims.

We claim:

1. A phenol containing a mixture of a trivalent phosphorus-containing organic compound of the formula

where Z is selected from the group consisting of hydroxyl, hydrogen, alkyl of one to twelve carbon atoms, phenyl, phenoxy, substituted phenyl where the substituents are selected from alkyl of one to eight carbon atoms, chloro and bromo groups, and substituted phenoxy where the substituents are selected from alkyl of one to eight carbon atoms, chloro and bromo groups, where Z' is selected from the group consisting of hydrogen, alkyl of one to twelve carbon atoms, phenyl, phenoxy, substituted phenyl where the substituents are selected from alkyl of one to eight carbon atoms, chloro and bromo groups, and substituted phenoxy where the substituents are selected from alkyl of one to eight carbon atoms, chloro and bromo groups, and Z″ is selected from the group consisting of alkyl of one to twelve carbon atoms, phenyl, phenoxy, substituted phenyl where the substituents are selected from alkyl of one to eight carbon atoms, chloro and bromo groups, and substituted phenoxy where the substituents are selected from alkyl of one to eight carbon atoms, chloro and bromo groups, and an organic acid selected from the group consisting of aromatic ortho-hydroxy-carboxylic acids of the formula

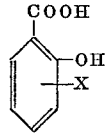

where X is selected from the group consisting of hydrogen, alkyl of one to five carbon atoms, and carboxyl groups; saturated aliphatic polycarboxylic acids containing from two to ten carbon atoms and unsubstituted except in that they have from two to three carboxyl groups and may also contain one or more hydroxy substituents; and mixtures thereof, each phosphorus compound and acid present in the combination being in a stabilizing proportion, and said phenol being selected from the group consisting of phenol, unsubstituted polyhydric monocyclic phenols, unsubstituted fused ring phenols, unsubstituted alkylidene linked bisphenols, their lower alkyl derivatives and their halogenated derivatives.

2. A phenol of claim 1 wherein the mixture present is in an amount between about 0.001 percent and about 0.5 percent by weight of the phenol.

3. A phenol of claim 1 wherein the mixture present is in an amount between about 0.002 percent to about 0.02 percent by weight of the phenol.

4. A phenol of claim 1 stabilized with a mixture of triphenyl phosphite, hydroxyisophthalic acid and citric acid.

5. A phenol of claim 1 stabilized with a mixture of triphenyl phosphite, hydroxyisophthalic acid and oxalic acid.

6. Phenol (C₆H₅OH) in accordance with claim 1.

7. Phenol (C₆H₅OH) in accordance with claim 1 stabilized with a mixture of triphenyl phosphite, hydroxyisophthalic acid and citric acid.

8. Phenol (C₆H₅OH) in accordance with claim 1 stabilized with a mixture of triphenyl phosphite, hydroxyisophthalic acid and oxalic acid.

9. Phenol (C₆H₅OH) in accordance with claim 1 stabilized with a mixture of triphenyl phosphite and oxalic acid.

10. Phenol (C₆H₅OH) in accordance with claim 1 stabilized with a mixture of triphenyl phosphite, salicylic acid and citric acid.

11. Phenol (C₆H₅OH) in accordance with claim 1 stabilized with a mixture of triphenyl phosphite, salicylic acid and oxalic acid.

12. Stabilized o-cresol in accordance with claim 1.

13. Stabilized o-chlorophenol in accordance with claim 1.

14. A phenol containing a mixture of a phosphite ester of the formula

where R, R' and R″ are selected from the group consisting of hydrogen, alkyl of one to twelve carbon atoms, phenyl, substituted phenyl where the substituents are selected from alkyl of one to eight carbon atoms, chloro and bromo groups, and where R, R' and R″ can be up to two hydrogen atoms; and an organic acid selected from the group consisting of aromatic ortho-hydroxy carboxylic acids of the formula

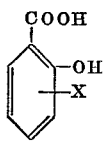

where X is selected from the group consisting of hydrogen, alkyl of one to five carbon atoms and carboxyl groups; saturated aliphatic polycarboxylic acids containing from one to ten carbon atoms and unsubstituted except in that they have from two to three carboxyl groups and may also contain one or more hydroxyl substituents; and mixtures thereof, each phosphite ester and acid present in the combination being in a stabilizing proportion, said phenol being selected from the group consisting of phenol, unsubstituted polyhydric monocyclic phenols, unsubstituted fused ring phenols, unsubstituted alkylidene linked bisphenols, their lower alkyl derivatives and their halogenated derivatives, polyhydric phenols, halophenols containing one to five halogen atoms, lower alkylphenols, fused-ring phenols, and alkylidene linked bisphenols.

References Cited

UNITED STATES PATENTS

| | | |
|---|---|---|
| 2,672,485 | 3/1954 | Menn et al. |
| 2,727,928 | 12/1955 | Menn et al. |
| 2,752,398 | 6/1956 | Riley. |
| 2,829,176 | 4/1958 | Clough. |

LEON ZITVER, *Primary Examiner.*

H. ROBERTS, *Assistant Examiner.*